(12) United States Patent
Jung

(10) Patent No.: US 12,280,626 B2
(45) Date of Patent: Apr. 22, 2025

(54) VEHICLE BODY TILTING APPARATUS AND CONTROL METHOD THEREOF

(71) Applicant: HL MANDO CORPORATION, Pyeongtaek-si (KR)

(72) Inventor: Daehee Jung, Seongnam-si (KR)

(73) Assignee: HL MANDO CORPORATION, Pyeongtaek-si (KR)

(*) Notice: Subject to any disclaimer, the term of this patent is extended or adjusted under 35 U.S.C. 154(b) by 74 days.

(21) Appl. No.: 18/140,286

(22) Filed: Apr. 27, 2023

(65) Prior Publication Data
US 2023/0364959 A1    Nov. 16, 2023

(30) Foreign Application Priority Data
May 16, 2022    (KR) .................... 10-2022-0059754

(51) Int. Cl.
*B60G 17/016*    (2006.01)
(52) U.S. Cl.
CPC .... *B60G 17/0162* (2013.01); *B60G 2202/422* (2013.01); *B60G 2204/419* (2013.01); *B60G 2800/012* (2013.01)
(58) Field of Classification Search
CPC .......... B60G 17/0162; B60G 2202/422; B60G 2204/419; B60G 2800/012; B60G 17/0157; B60G 17/0165; B60G 2202/42; B60G 2202/442; B60G 2400/0511; B60G 2800/0194; B60G 21/007; B60G 2204/62; B60G 2400/051; B62D 9/02; B62D 9/04

USPC ........................................................ 280/5.507
See application file for complete search history.

(56) References Cited

U.S. PATENT DOCUMENTS

| | | | | |
|---|---|---|---|---|
| 10,427,746 B2* | 10/2019 | Yoshino | ................ | B62K 5/08 |
| 10,639,953 B2* | 5/2020 | Kimura | ............... | B60G 21/007 |
| 10,696,326 B2* | 6/2020 | Takenaka | ........... | B60G 17/0162 |
| 11,648,916 B2* | 5/2023 | Saito | ......................... | B60T 1/06 |
| | | | | 310/68 B |
| 2020/0231200 A1* | 7/2020 | Araki | ....................... | B62D 9/02 |

FOREIGN PATENT DOCUMENTS

| | | | |
|---|---|---|---|
| JP | 2008-148412 A | 6/2008 | |
| JP | 2018203148 A | * 12/2018 | ........... B60G 17/005 |
| JP | 2020-188607 A | 11/2020 | |

* cited by examiner

*Primary Examiner* — Paul N Dickson
*Assistant Examiner* — Caitlin Anne Miller
(74) *Attorney, Agent, or Firm* — Hauptman Ham, LLP

(57) ABSTRACT

Disclosed herein is a vehicle body tilting apparatus including a swing member connected to a pair of tie rods and provided to be swung around an output shaft, a lean actuator configured to swing the swing member by rotating the output shaft through a motor and a reducer so that a vehicle body is tilted in a right-left direction, and a controller electrically connected to the motor. The controller is configured to correct a rotation angle of the output shaft based on a relative angle of the motor, and control the motor according to the corrected rotation angle.

19 Claims, 9 Drawing Sheets

VEHICLE BODY TILTING APPARATUS AND CONTROL METHOD THEREOF

CROSS-REFERENCE TO RELATED APPLICATION

This application claims the benefit of Korean Patent Application No. 10-2022-0059754, filed on May 16, 2022 in the Korean Intellectual Property Office, the disclosure of which is incorporated herein by reference.

BACKGROUND

1. Field

Embodiments of the present disclosure relate to a vehicle body tilting apparatus for tilting a vehicle body in a width direction of a vehicle using a lean actuator and a control method thereof.

2. Description of the Related Art

A vehicle body tilting apparatus tilts a vehicle body in a width direction of a vehicle using a lean actuator for tilting the vehicle body to improve turning performance of the vehicle or travel on an inclined road surface in a horizontal direction.

The lean actuator causes a right-and-left-wheel support member for supporting right and left wheels in an up-down direction and the vehicle body to rotate relative to each other, thereby tilting the vehicle body in a right-left direction, which is the width direction of the vehicle, with respect to a normal line of the road surface.

The lean actuator includes a motor and a reducer. In the lean actuator, the rotation speed of a rotating shaft of the motor is reduced by the reducer, and an output is made through an output shaft connected to the right-and-left-wheel support member.

In order to improve the turning performance and tilting performance of the vehicle, it is important to accurately control the lean actuator.

In the related art, a rotation angle of the output shaft is directly detected through an absolute angle sensor mounted on the output shaft of the lean actuator, and the motor is controlled based on the rotation angle of the output shaft.

However, since the accuracy of the lean actuator depends on the accuracy of the absolute angle sensor for detecting the rotation angle (absolute angle) of the output shaft, there is a limit to improving the accuracy of the lean actuator. For this reason, there is a concern that lean actuators may not be applied to products requiring higher accuracy.

SUMMARY

Therefore, it is an aspect of the present disclosure to provide a vehicle body tilting apparatus capable of increasing the accuracy of a lean actuator to improve performance and a control method thereof.

In accordance with one aspect of the present disclosure, there is provided a vehicle body tilting apparatus including a swing member connected to a pair of tie rods and provided to be swung around an output shaft, a lean actuator configured to swing the swing member by rotating the output shaft through a motor and a reducer so that a vehicle body is tilted in a right-left direction, and a controller electrically connected to the motor. The controller may correct a rotation angle of the output shaft based on a relative angle of the motor, and control the motor according to the corrected rotation angle.

The vehicle body tilting apparatus may further include a first angle sensor provided on the motor and configured to detect the relative angle of the motor, and a second angle sensor including at least one of an absolute angle sensor provided on the output shaft or a relative angle sensor provided on the output shaft. The absolute angle sensor may directly detect an absolute angle of the output shaft. The relative angle sensor may directly detect the relative angle of the output shaft.

The controller may estimate the relative angle of the motor according to the absolute angle of the output shaft detected by the second angle sensor including the absolute angle sensor, detect the relative angle of the motor through the first angle sensor, determine a difference between the estimated relative angle of the motor and the detected relative angle of the motor, and identify whether or not to correct the rotation angle of the output shaft based on the difference.

The controller may correct the rotation angle of the output shaft based on a difference between the estimated relative angle and the detected relative angle is being smaller than a preset angle.

The controller may correct the rotation angle of the output shaft based on the difference and a reduction ratio of the reducer.

The controller may correct the rotation angle of the output shaft to an angle value obtained by adding, to the absolute angle of the output shaft detected by the second angle sensor including the absolute angle sensor, a value obtained by multiplying the difference by the reduction ratio of the reducer.

The vehicle body tilting apparatus may further include a relative angle sensor provided on the motor and configured to detect the relative angle of the motor, and an output shaft rotation detector configured to indirectly detect the rotation angle of the output shaft.

The output shaft rotation detector may include a first gear coupled to the output shaft and having a central shaft positioned coaxially with the output shaft, a second gear engaged with the first gear to rotate in an opposite direction to the first gear around an auxiliary shaft, and an absolute angle sensor provided on the auxiliary shaft and configured to detect an absolute angle of the auxiliary shaft.

The controller may estimate the relative angle of the motor according to the absolute angle of the auxiliary shaft detected by the absolute angle sensor, detect the relative angle of the motor through the relative angle sensor, determine a difference between the estimated relative angle of the motor and the detected relative angle of the motor, and identify whether or not to correct the rotation angle of the output shaft based on the difference.

The controller may correct the rotation angle of the output shaft a difference between the estimated relative angle and the detected relative angle being smaller than a preset angle.

The controller may correct the rotation angle of the output shaft based on the difference and a reduction ratio of the reducer.

The controller may estimate the rotation angle of the output shaft based on the absolute angle of the auxiliary shaft detected by the absolute angle sensor and a gear ratio between the first gear and the second gear, and correct the rotation angle of the output shaft to an angle value obtained by adding, to the estimated rotation angle, an angle value obtained by multiplying the difference by the reduction ratio of the reducer.

The controller may estimate the relative angle of the motor based on the absolute angle of the auxiliary shaft detected by the absolute angle sensor, the reduction ratio of the reducer, and a gear ratio between the first gear and the second gear.

In accordance with another aspect of the present disclosure, there is provided a method of controlling a vehicle body tilting apparatus including a swing member connected to a pair of tie rods and provided to be swung around an output shaft, a lean actuator configured to swing the swing member by rotating the output shaft through a motor and a reducer so that the vehicle body is tilted in a right-left direction, and a controller electrically connected to the motor, the vehicle body tilting apparatus further including an output shaft rotation detector including a first gear coupled to the output shaft and having a central shaft positioned coaxially with the output shaft, a second gear engaged with the first gear to rotate in an opposite direction to the first gear around an auxiliary shaft, and a rotation angle sensor provided on the auxiliary shaft and configured to detect a rotation angle of the auxiliary shaft, the method including: by the controller, detecting the rotation angle of the auxiliary shaft through the rotation angle sensor, estimating a rotation angle of the output shaft according to the detected rotation angle of the auxiliary shaft, estimating a relative angle of the motor according to the detected rotation angle of the auxiliary shaft, detecting the relative angle of the motor through a relative angle sensor provided on the motor, determining a difference between the estimated relative angle of the motor and the detected relative angle of the motor, and correcting the estimated rotation angle of the output shaft based on the difference.

The estimating of the rotation angle of the output shaft may include estimating the rotation angle of the output shaft based on the detected rotation angle of the auxiliary shaft and a gear ratio between the first gear and the second gear.

The estimating of the relative angle of the motor may include estimating the relative angle of the motor based on the detected rotation angle of the auxiliary shaft, a reduction ratio of the reducer, and a gear ratio between the first gear and the second gear.

The correcting of the estimated rotation angle of the output shaft may include comparing the difference with a preset angle and correcting the estimated rotation angle of the output shaft based on a difference between the estimated relative angle and the detected relative angle being smaller than the preset angle as a result of the comparing.

The correcting of the estimated rotation angle of the output shaft may include correcting the estimated rotation angle of the output shaft based on the difference and a reduction ratio of the reducer.

The correcting of the estimated rotation angle of the output shaft may include correcting the estimated rotation angle of the output shaft to an angle value obtained by adding the estimated rotation angle of the output shaft to a value obtained by multiplying the difference by the reduction ratio of the reducer.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
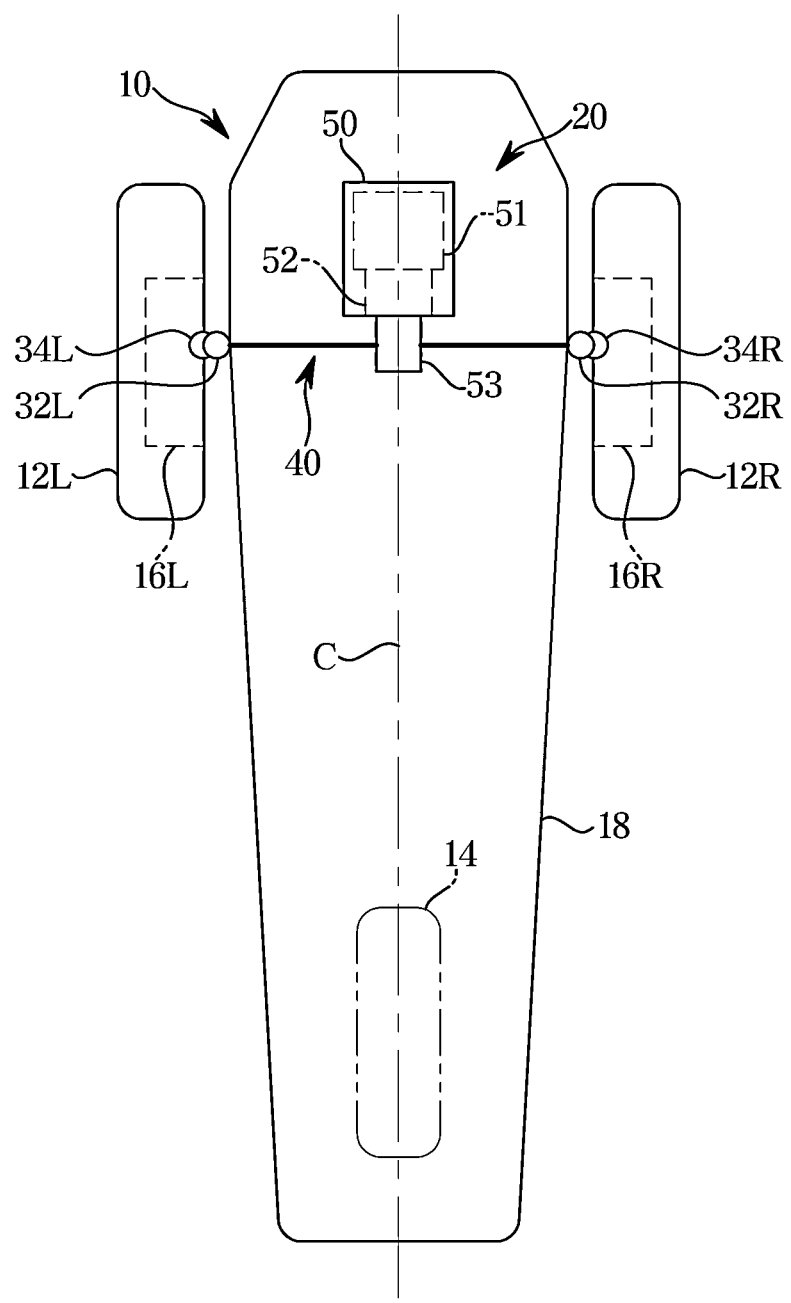
FIG. 1 illustrates a schematic configuration of a vehicle to which a vehicle body tilting apparatus according to one embodiment is applied.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Figure 2:
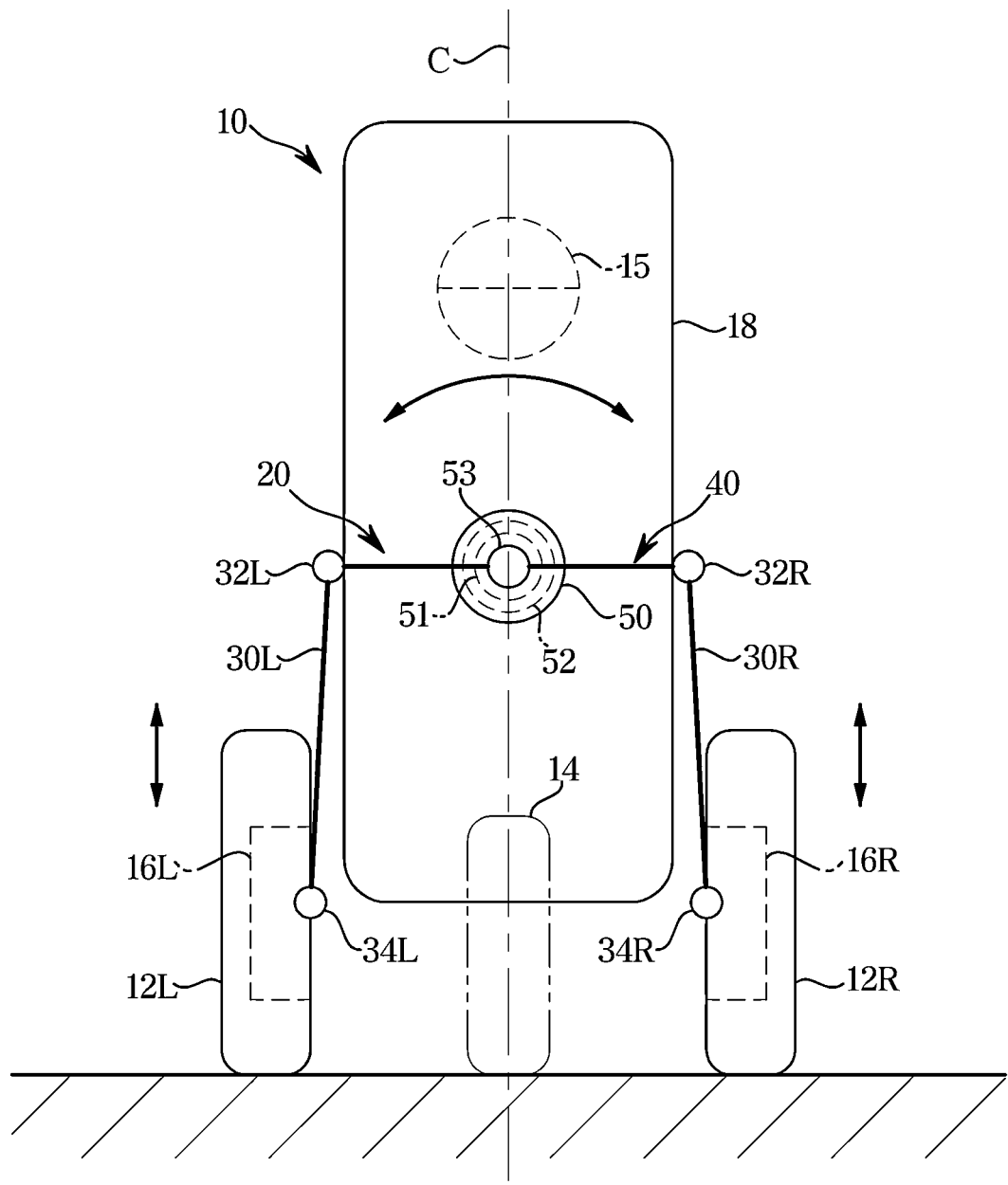
FIG. 2 illustrates a schematic configuration of the vehicle of FIG. 1 when viewed from the front.

FIG. 1 illustrates a schematic configuration of a vehicle to which a vehicle body tilting apparatus according to one embodiment is applied, and FIG. 2 illustrates a schematic configuration of the vehicle of FIG. 1 when viewed from the front.

Referring to FIGS. 1 and 2, a vehicle 10 to which a vehicle body tilting apparatus 20 according to one embodiment is applied is a three-wheeled vehicle including a pair of front wheels 12L and 12R that are non-steerable drive wheels and one rear wheel 14 that is a steerable non-drive wheel.

The front wheels 12L and 12R are spaced apart from each other in a transverse direction of the vehicle 10, and are supported by corresponding carriers 16L and 16R, respectively, to be rotatable around a rotating shaft.

The rear wheel 14 is disposed to be steered by a steering device by the amount of operation of a steering wheel 15 by a driver.

The carriers 16L and 16R include an in-wheel motor as a driving device.

The carriers 16L and 16R are each supported by suspension arms, such as corresponding leading arms, to be vertically displaceable relative to the vehicle body 18, and limit displacement in the transverse direction with respect to the vehicle body 18.

The output of the in-wheel motor is controlled according to the operation of an accelerator pedal. Braking forces of the front wheels 12L and 12R and the rear wheel 14 are controlled by the operation of the brake pedal.

The vehicle body tilting apparatus 20 includes a pair of tie rods 30L and 30R, a swing member 40 as a member for supporting right and left wheels, and a lean actuator 50 for swinging the swing member 40.

The tie rods 30L and 30R extend substantially in the up-down direction on both sides in the transverse direction with respect to an output shaft 53 of the lean actuator 50 connected to the swing member 40, and are rotatably connected to the swing member 40 at their upper ends by joints 32L and 32R such as ball joints, respectively. In addition, the tie rods 30L and 30R are rotatably connected to corresponding carriers 16L and 16R at their lower ends by joints 34L and 34R such as ball joints, respectively.

The lean actuator 50 is a rotary actuator and includes a motor 51, a reducer 52, and the output shaft 53.

The motor 51 is, for example, a direct current (DC) motor and may rotate in either a clockwise or counterclockwise direction depending on the direction of an applied voltage. An axis of a rotating shaft of the motor 51 extends in a front-rear direction of the vehicle 10. An input shaft of the reducer 52 is connected to the rotating shaft of the motor 51. An axis of the output shaft 53 of the reducer 52 extends in the front-rear direction of the vehicle 10.

The rotational motion of the motor 51 is reduced by the reducer 52 and then transmitted to the swing member 40.

The swing member 40 is a member extending in the width direction of the vehicle 10. A central portion of the swing member 40 is fixed to the output shaft 53 of the reducer 52.

Therefore, when the motor 51 rotates forward, the output shaft 53 rotates forward, and accordingly, the swing member 40 rotates clockwise around the output shaft 53. On the other hand, when the motor 51 reversely rotates, the output shaft 53 reversely rotates, and accordingly, the swing member 40 rotates counterclockwise around the output shaft 2.

When the swing member 40 swings around the output shaft 53 of the lean actuator 50, the tie rods 30L and 30R move up and down in opposite directions, and thus the front wheels 12L and 12R moves up and down in opposite directions with respect to the vehicle body 22. As a result, the vehicle 10 is inclined to the right or left transverse direction.

Figure 3:
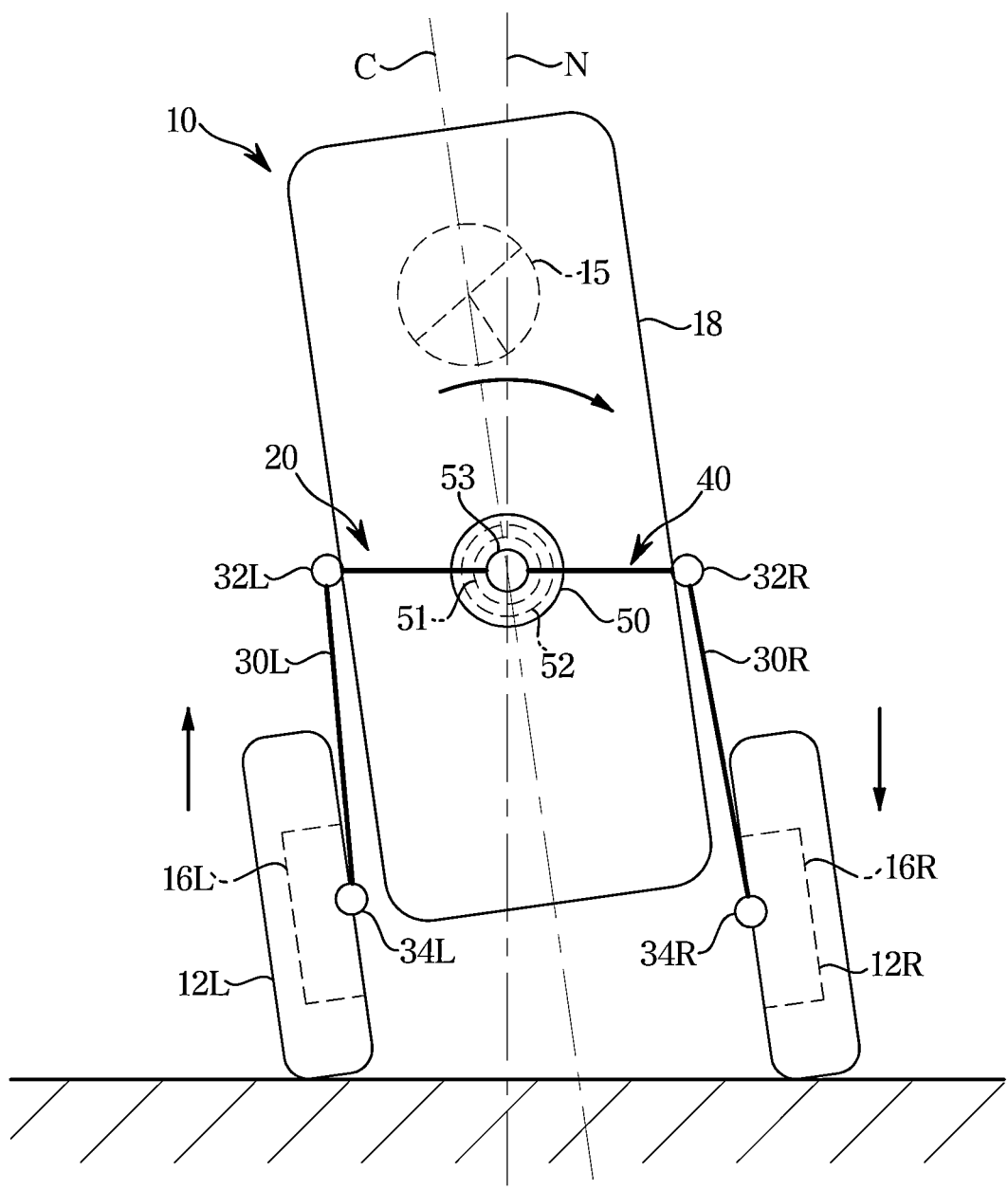
FIG. 3 is a view for describing an operation of the vehicle body tilting apparatus when the vehicle of FIG. 1 turns left.

FIG. 3 is a view for describing an operation of the vehicle body tilting apparatus when the vehicle of FIG. 1 turns left.

Referring to FIG. 3, when the motor 51 rotates clockwise when viewed from the front, the swing member 40 rotates clockwise around the output shaft 53. Therefore, the left tie rod 30L connected to the left ball joint 32L is pulled upward by the rotation of the swing member 40, and the right tie rod 30R connected to the right ball joint 32R is pushed downward by the rotation of the swing member 40. As a result, the vehicle body 18 is inclined to the left.

Figure 4:
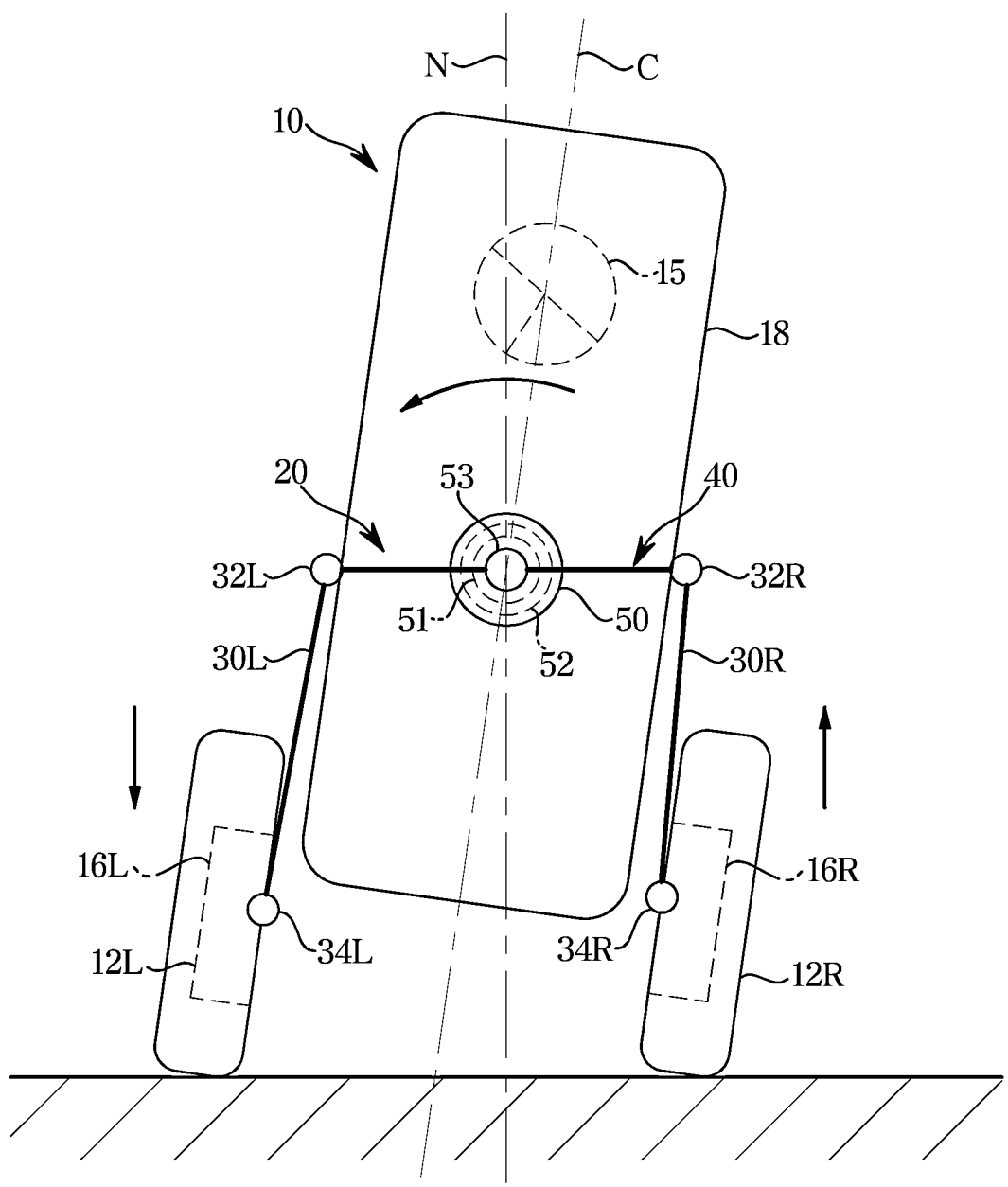
FIG. 4 is a view for describing an operation of the vehicle body tilting apparatus when the vehicle of FIG. 1 turns right.

FIG. 4 is a view for describing an operation of the vehicle body tilting apparatus when the vehicle of FIG. 1 turns right.

Referring to FIG. 4, when the motor 51 rotates counterclockwise when viewed from the front, the swing member 40 rotates counterclockwise around the output shaft 53. Therefore, the right tie rod 30R connected to the right ball joint 32R is pulled upward by the rotation of the swing member 40, and the left tie rod 30L connected to the left ball joint 32L is pushed downward by the rotation of the swing member 40. As a result, the vehicle body 18 is inclined to the right.

Referring to FIGS. 3 and 4, a tilt angle of the vehicle 10 is an angle formed by a center line C along the up-down direction of the vehicle 10 with respect to a vertical direction N.

When the swing angle of the swing member 40 is zero (0) and the center line C coincides with the vertical direction N, the tilt angle is 0. As the vehicle 10 is tilted to the left, the tilt angle is a positive value, and as the vehicle 10 is tilted to the right, it is a negative value.

The vehicle body tilting apparatus 20 calculates a target tilt angle of the vehicle 10 and controls the rotation angle of the motor 51 of the lean actuator 50 so that the tilt angle of the vehicle 10 becomes the target tilt angle. Therefore, in order to improve the turning performance and tilting performance of the vehicle, it is important to accurately control the lean actuator 50.

Figure 5:
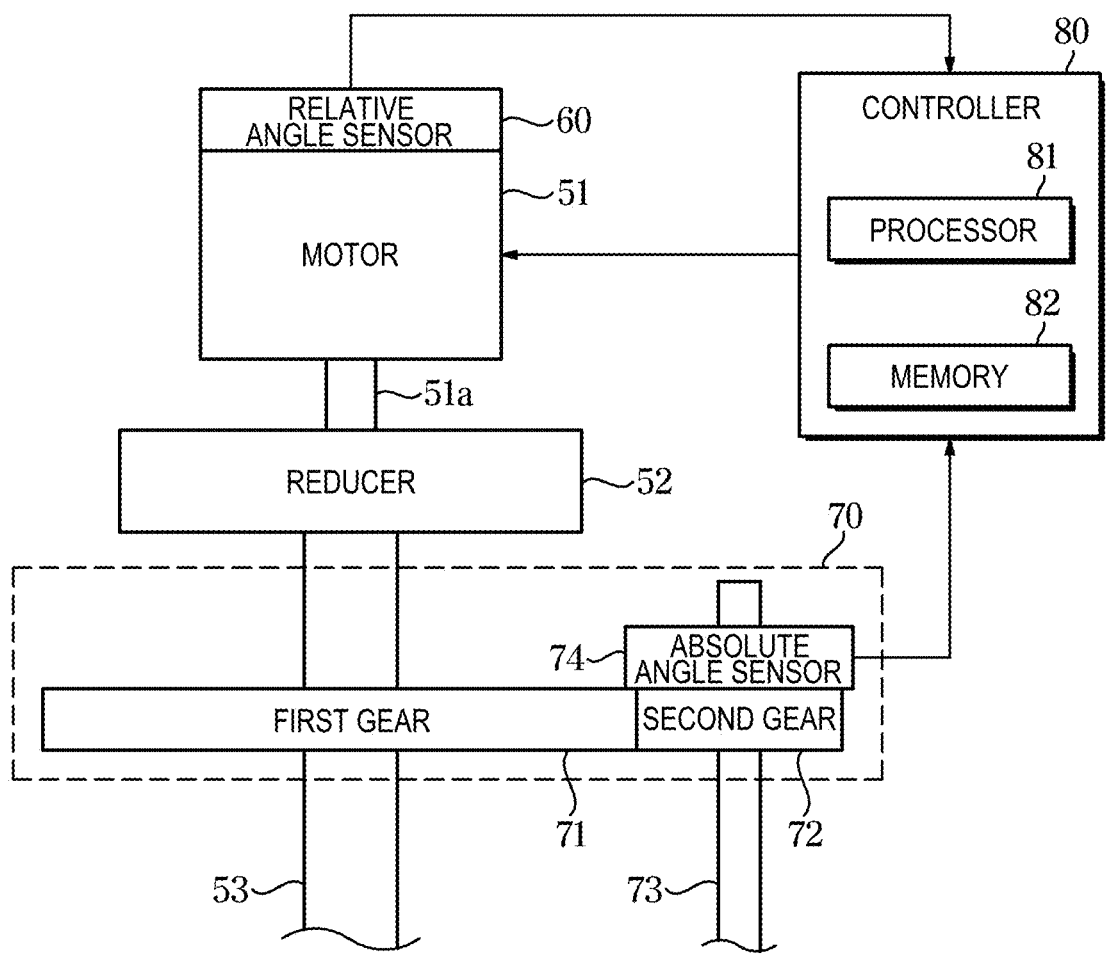
FIG. 5 illustrates a configuration of the vehicle body tilting apparatus according to one embodiment.

FIG. 5 illustrates a configuration of the vehicle body tilting apparatus according to one embodiment.

Referring to FIG. 5, the vehicle body tilting apparatus 20 includes the lean actuator 50, a relative angle sensor 60, an output shaft rotation detector 70, and a controller 80.

In the lean actuator 50, the rotation speed of a rotating shaft 51a of the motor 51 is reduced by the reducer 52, and the output is made through the output shaft 53 and transmitted to the swing member 40.

The motor 51 may rotate in either clockwise or counterclockwise direction.

An input side of the reducer 52 is connected to the rotating shaft 51a of the motor 51. An output side of the reducer 52 is connected to the output shaft 53 connected to the swing member 40. Therefore, when the motor 51 rotates forward, the output shaft 53 rotates forward, and when the motor 51 reversely rotates, the output shaft 53 reversely rotates.

The reducer 52 is a variable gear ratio unit and may be, for example, a harmonic drive. The harmonic drive is useful for manufacturing a compact reducer and obtaining a large transmission ratio, and thus is mainly used as the reducer 52 of the lean actuator 50.

In general, the harmonic drive basically includes a wave generator, a flex spline, and a circular spline. In the wave generator, a ball bearing is assembled on an outer circumferential surface of an elliptical cam to which an input shaft is connected, and the flex spline is tightly fitted and coupled to an outer ring of the ball bearing. The flex spline is a circular thin metal elastic body, and has a first tooth profile (gear teeth) formed on one outer circumferential surface, and the circular spline has a second tooth profile corresponding to the first tooth profile of the flex spline formed on an inner circumferential surface.

In the harmonic drive, power is transmitted in the order of the input shaft, the wave generator connected to the input shaft, the flex spline, the circular spline engaged with the flex spline, and the output shaft connected to the circular spline. That is, when the wave generator to which the input shaft is coupled rotates clockwise, the flex spline causes gradual elastic deformation, and a part of the first tooth profile of the flex spline is combined with a part of the second tooth profile of the circular spline to transmit power. In this case, a reducer having a large reduction ratio may be implemented due to a difference between the size of the first tooth profile formed on the outer circumferential surface of the flex spline and the size of the second tooth profile of the circular spline.

When the reduction ratio of the reducer 52 is "1/L," one rotation of the output shaft 53 corresponds to L rotations of the rotating shaft 51a of the motor 51. For example, when the gear ratio of the reducer 52 is "1/120", the output shaft 53 rotates once while the rotating shaft 51a of the motor 51 rotates 120 times.

The relative angle sensor 60 detects a rotation angle (relative angle) of the rotating shaft 51a of the motor 51. The relative angle sensor 60 may be an encoder or a resolver for detecting a relative angle with respect to rotation of the motor shaft 51a. In addition to those describe above, various sensor types capable of detecting relative angles may be applicable.

The output shaft rotation detector 70 includes a first gear 71, a second gear 72, an auxiliary shaft 73, and an absolute angle sensor 74 as a rotation angle sensor.

The first gear 71 is coupled to the output shaft 53 of the lean actuator 50. A central axis of the first gear 71 is located coaxially with the output shaft 53. Accordingly, the first gear 71 rotates clockwise or counterclockwise together with the output shaft 53.

The second gear 72 is engaged with the first gear 71 and rotates in an opposite direction to the first gear 71 around the auxiliary shaft 73.

A diameter of the second gear 72 is smaller than that of the first gear 71. The reduction ratio between the first gear 71 and the second gear 72 may be, for example, "1/3". That is, when the output shaft 53 rotates once, the first gear 71 also rotates once, and while the first gear 71 rotates once, the second gear 72 may rotate three times.

The absolute angle sensor 74 is provided on the side of the second gear 72 and detects the rotation angle (absolute angle) of the auxiliary shaft 73.

The absolute angle sensor 74 is a rotation angle sensor capable of directly detecting an absolute rotation angle (cumulative rotation angle from a reference angle) that varies within a range exceeding 360°. For reference, the relative angle sensor is a rotation angle sensor not capable of directly detecting an absolute rotation angle (cumulative rotation angle from a reference angle) that varies within a range exceeding 360°.

The output shaft rotation detector 70 having the configuration as described above indirectly detects the rotation of the output shaft 53. The output shaft rotation detector 70 converts the rotation of the output shaft 53 into the rotation of the auxiliary shaft 73 through the first gear 71 and the second gear 72, and detects the converted rotation of the auxiliary shaft 73 using the absolute angle sensor 74.

The controller 80 may include a processor 81 and a memory 82.

The memory 82 may store programs and/or data for processing data of various sensors of the vehicle body tilting apparatus 20. For example, the memory 82 may store programs and/or data for processing relative angle data of the relative angle sensor 60 and/or absolute angle data of the absolute angle sensor 74. Further, the memory 82 may store programs and/or data for controlling the lean actuator 50.

The memory 82 may include not only volatile memories such as a static random-access memory (S-RAM) and a dynamic random-access memory (D-RAM), but also non-volatile memories such as a flash memory, a read only memory (ROM), and an erasable programmable read only memory (EPROM).

The processor 81 may generate a driving signal for controlling the motor 51 based on the rotation angle of the output shaft 53 of the lean actuator 50. The processor 81 may control the lean actuator 50 by outputting the driving signal to the motor 51 of the lean actuator 50.

The processor 81 may include a digital processor for processing the relative angle data of the relative angle sensor 60 and the absolute angle data of the absolute angle sensor 74, a signal processor, or a micro control unit (MCU) for generating a driving signal.

The controller 80 receives a command provided from an upper-level apparatus of the vehicle 10, and estimates, according to the received command, the rotation angle of the output shaft 53 of the lean actuator 50 based on the relative angle data of the relative angle sensor 60 and the absolute angle data of the absolute angle sensor 74. The controller 80 estimates each of the absolute angle of the output shaft 53 and the relative angle of the motor 51, from the absolute angle of the auxiliary shaft 73 detected by the absolute angle sensor 74, and corrects the estimated absolute angle of the output shaft based on the relative angle of the motor detected by the relative angle sensor 60 and the estimated relative angle of the motor.

The controller 80 generates a driving signal based on the estimated rotation angle of the output shaft and provides the driving signal to the motor 51 of the lean actuator 50, and thus the current tilt angle of the vehicle body 18 reaches the target tilt angle.

As described above, in the related art, the rotation angle of the output shaft 53 is directly detected through an absolute angle sensor mounted on the output shaft 53 of the lean actuator 50 to control the motor 51.

However, in general, the accuracy of the absolute angle sensor used in the lean actuator 50 is ±1.5°, for example. The accuracy is very low compared to ±0.5°, which is the accuracy of the relative angle sensor mounted on the motor.

In order to increase the accuracy of the absolute angle sensor, a relatively high-accuracy absolute angle sensor has to be employed. However, such a sensor has a limitation in that the sensor is difficult to be miniaturized into a small product due to its large size and increases manufacturing costs due to the relatively high sensor cost.

The output shaft rotation detector 70 of the vehicle body tilting apparatus 20 according to one embodiment includes the first gear 71, the second gear 72, the auxiliary shaft 73, and the absolute angle sensor 74, converts the rotation of the output shaft 53 into the rotation of the auxiliary shaft 73 through the first gear 71 and the second gear 72, and detects the converted rotation of the auxiliary shaft 73 using the absolute angle sensor 74.

Therefore, even if the absolute angle sensor 74 with an accuracy of ±1.5° is used as in the related art, it is possible to apply the gear ratio (1/3) between the first gear 71 and the second gear 72, thereby increasing sensor accuracy to ±0.5°, which is an accuracy that is three times higher than the related art. Here, when the relative angle sensor 60 with an accuracy of ±0.5° is considered together, the accuracy of the rotation angle with respect to the output shaft 53 may be increased to a maximum of ±0.0042°.

Therefore, with the vehicle body tilting apparatus 20 according to one embodiment, it is possible to maintain product miniaturization and minimize an increase in manufacturing costs, and to improve its performance by increasing the accuracy of the lean actuator.

Figure 6:
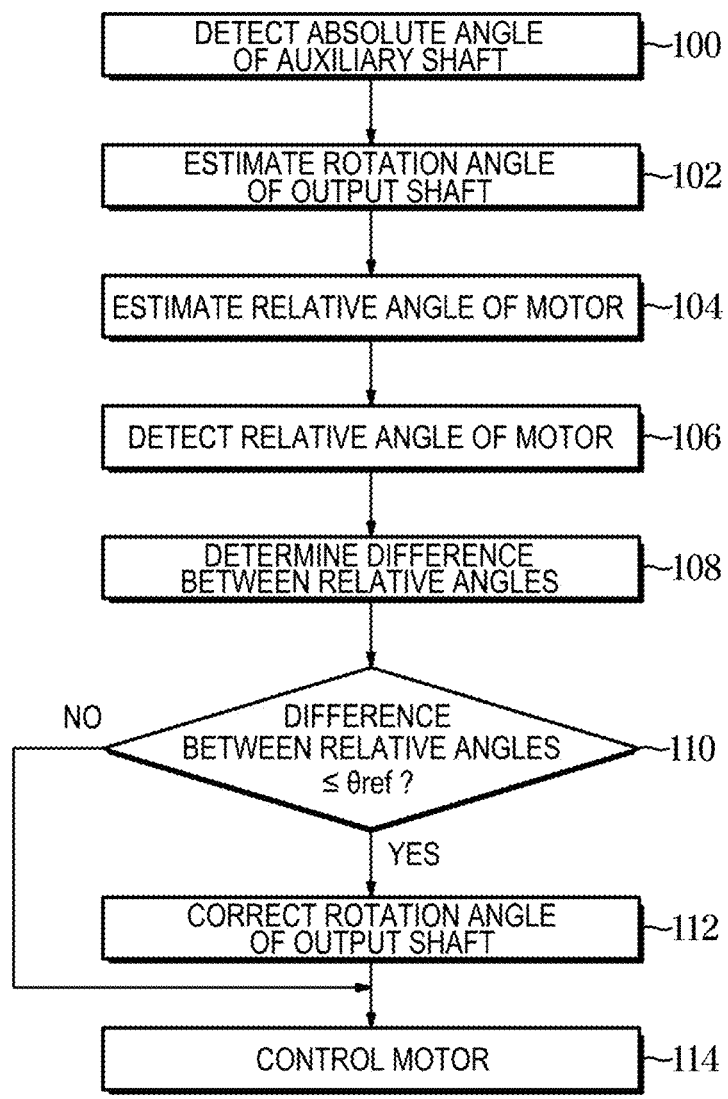
FIG. 6 is a flowchart illustrating an operation of the vehicle body tilting apparatus according to one embodiment.

FIG. 6 is a flowchart illustrating an operation of a vehicle body tilting apparatus according to one embodiment.

Referring to FIG. 6, the vehicle body tilting apparatus 20 detects an absolute angle of the auxiliary shaft 73 through the absolute angle sensor 74 (100).

The controller 80 receives absolute angle data from the absolute angle sensor 74 of the output shaft rotation detector 70, and obtains the absolute angle of the auxiliary shaft 73 from the received data.

The vehicle body tilting apparatus 20 estimates a rotation angle of the output shaft 53 from the absolute angle of the auxiliary shaft 73 (102).

The controller 80 may obtain the rotation angle of the output shaft 53 by applying a gear ratio between the first gear 71 and the second gear 72 to the absolute angle of the auxiliary shaft 73. For example, when the absolute angle is 120° and the gear ratio is 1/3, the rotation angle of the output shaft 53 may be estimated to be 120°×1/3=40°.

The vehicle body tilting apparatus 20 estimates a relative angle of the motor from the absolute angle of the auxiliary shaft (104).

The controller 80 may obtain the relative angle of the motor 51 by applying the reduction ratio of the reducer 52 and the gear ratio between the first gear 71 and the second gear 72 to the absolute angle of the auxiliary shaft 73. For example, when the absolute angle is 120°, the reduction ratio is 1/120, and the gear ratio is 1/3, the relative angle of the motor 51 may be estimated to be the result of the expression (120°×120×1/3)÷360.

The vehicle body tilting apparatus 20 determines a difference between the detected relative angle of the motor and the estimated relative angle of the motor (108).

The vehicle body tilting apparatus 20 compares the difference between the relative angles with a preset angle θref and identifies whether the difference between the relative angles is less than or equal to the preset angle (110).

For example, assuming that the accuracy of the relative angle sensor 60 is ±0.5 deg, the accuracy of the absolute angle sensor 74 is ±1.5 deg, and the mechanical clearance and lead error of the lean actuator 50 are 0, a range of relative positions of the rotating shaft 51a of the motor 51 from the absolute angle sensor 74 may be seen to be within ±60 deg (±60 deg=±1.5 deg (absolute angle sensor accuracy) *120*(1/3)). At this time, the reduction ratio of the reducer 52 is 1/120, and the gear ratio between the first gear 71 and the second gear 72 is 1/3. In the case of ±0.5 deg, the accuracy of the relative angle sensor 60 is included in the ±60 deg, and the difference between the relative angles is at most 60.5 deg. When the difference between the relative angles is within 60.5 deg, it is considered that the absolute angle sensor 74 correctly predicts the relative angle of the motor 51.

If the difference between the relative angles is less than or equal to the preset angle (YES in 110), the vehicle body tilting apparatus 20 corrects the rotation angle of the output shaft 53 (112).

The controller 80 corrects the rotation angle of the output shaft 53 estimated in operation 120 based on the difference between the relative angles and the reduction ratio of the reducer 52. For example, when the estimated rotation angle of the output shaft 53 is 30°, the difference between the relative angles (e.g., the detected relative angle of the motor is 240° and the estimated relative angle of the motor is 180°) is 60°, and the reduction ratio of the reducer 52 is 1/120, the estimated rotation angle of the output shaft is corrected to the value 30.5° obtained by adding the value of (60°×1/120) to 30°, the estimated rotation angle of the output shaft. That is, the rotation angle of the output shaft 53 is corrected from 30° to 30.5°.

The vehicle body tilting apparatus 20 controls the motor 51 of the lean actuator 50 based on the corrected rotation angle of the output shaft, according to a command from the upper-level apparatus to cause a current tilt angle of the vehicle body 18 to reach the target tilt angle (114).

On the other hand, when the difference between the relative angles exceeds the preset angle (NO in 110), meaning that the vehicle body tilting apparatus 20 did not correctly predict the relative angle of the motor 51, the rotation angle of the output shaft estimated in operation mode 102 is determined as the rotation angle of the output shaft, and the motor 51 of the lean actuator 50 is controlled based on the determined rotation angle of the output shaft (114).

As described above, even if the absolute angle sensor 74 with an accuracy of ±1.5° is used as in the related art, with the vehicle body tilting apparatus 20 according to one embodiment, it is possible to apply the gear ratio (1/3) between the first gear 71 and the second gear 72, thereby increasing sensor accuracy to ±0.5°, which is an accuracy that is three times higher than the related art. Here, when the relative angle sensor 60 with an accuracy of ±0.5° is considered together, the accuracy of the rotation angle with respect to the output shaft 53 may be increased to a maximum of ±0.0042°. Therefore, it is possible to maintain product miniaturization and minimize an increase in manufacturing costs, and to increase the accuracy of the lean actuator to improve performance.

Figure 7:
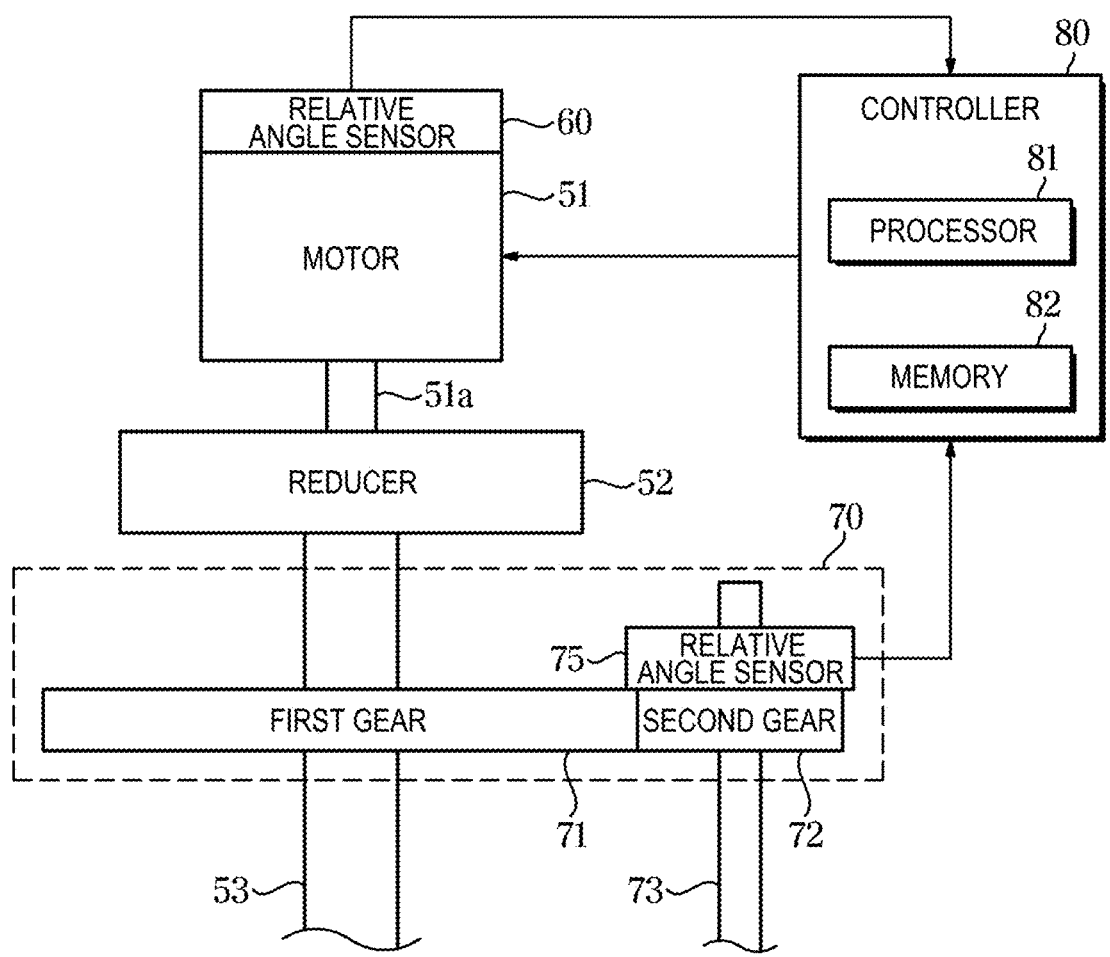
FIG. 7 illustrates a configuration of a vehicle body tilting apparatus according to another embodiment.

FIG. 7 illustrates a configuration of a vehicle body tilting apparatus according to another embodiment.

Referring to FIG. 7, a relative angle sensor 75 may be used instead of the absolute angle sensor 74 as the rotation angle sensor of FIG. 5. This is because the rotation range of the output shaft 53 is limited to a certain range due to the characteristics of the lean actuator 50.

In this case, the accuracy of the output shaft 53 may be increased because the accuracy of the relative angle sensor 75 is higher than that of the absolute angle sensor 74.

In the same manner as in FIG. 5, the rotation angle of the output shaft 53 is corrected according to the condition of the relative angle difference, and the motor is controlled based on the corrected rotation angle of the output shaft.

Figure 8:
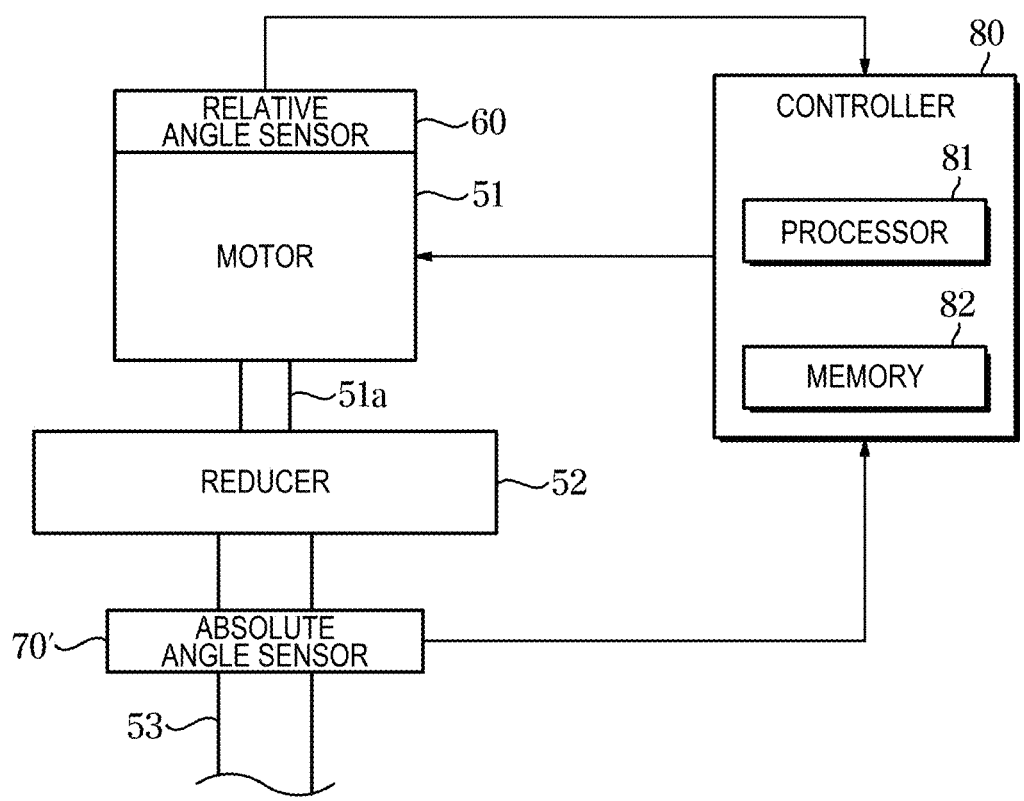
FIG. 8 illustrates a configuration of a vehicle body tilting apparatus according to still another embodiment.

FIG. 8 illustrates a configuration of a vehicle body tilting apparatus according to still another embodiment.

Referring to FIG. 8, an absolute angle sensor 70' may be used instead of the output shaft rotation detector 70 of FIG.

5. The absolute angle sensor 70' is provided to directly detect the absolute angle of the output shaft 53.

The vehicle body tilting apparatus 20 directly detects the absolute angle of the output shaft 53 through the absolute angle sensor 70', and estimates a relative angle of the motor 51 from the absolute angle of the output shaft 53. The vehicle body tilting apparatus 20 may obtain the relative angle of the motor 51 by applying the reduction ratio of the reducer 52 to the absolute angle of the output shaft 53.

The vehicle body tilting apparatus 20 determines the difference between the relative angle of the motor detected by the relative angle sensor 60 and the estimated relative angle of the motor, compares the difference between the relative angles with a preset angle θref', and identifies whether the difference between the relative angles is less than or equal to the preset angle. For example, assuming that the accuracy of the relative angle sensor 60 is ±0.5 deg, the accuracy of the absolute angle sensor 70' is ±1.5 deg, and the mechanical clearance and lead error of the lean actuator 50 are 0, a range of the relative positions of the rotating shaft 51a of the motor 51 from the absolute angle sensor 70' may be seen to be within ±180 deg (±180 deg=±1.5 deg (absolute angle sensor accuracy)*120). At this time, the reduction ratio of the reducer 52 is 1/120. In the case of ±0.5 deg, the accuracy of the relative angle sensor 60 is included in the ±180 deg, and the difference between the relative angles is at most 180.5 deg. When the difference between the relative angles is within 180.5 deg, it is considered that the absolute angle sensor 70' correctly predicts the relative angle of the motor 51.

When the difference between the relative angles is less than or equal to the preset angle, the vehicle body tilting apparatus 20 corrects the rotation angle of the output shaft 53 to an angle value obtained by adding, to the estimated rotation angle of the output, a value obtained by multiplying the difference between the relative angles by the reduction ratio of the reducer 52.

Figure 9:
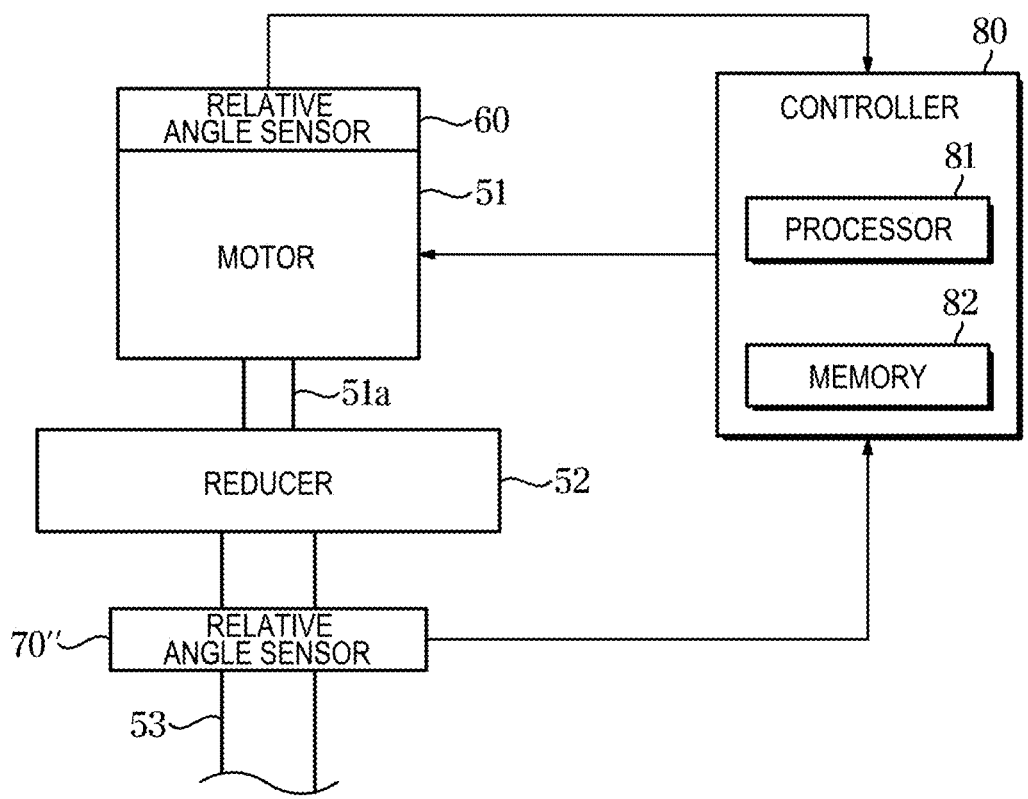
FIG. 9 illustrates a configuration of a vehicle body tilting apparatus according to still another embodiment.

FIG. 9 illustrates a configuration of a vehicle body tilting apparatus according to still another embodiment.

Referring to FIG. 9, a relative angle sensor 70" may be used instead of the absolute angle sensor 70' of FIG. 8. This is because the rotation range of the output shaft 53 is limited to a certain range due to the characteristics of the lean actuator 50.

In this case, the accuracy of the output shaft 53 may be increased because the accuracy of the relative angle sensor 75 is higher than that of the absolute angle sensor 74.

In the same manner as in FIG. 8, the rotation angle of the output shaft 53 is corrected according to the condition of the relative angle difference, and the motor is controlled based on the corrected rotation angle of the output shaft.

As is apparent from the above description, according to an aspect of the present disclosure, it is possible to increase the accuracy of the lean actuator to improve the performance.

According to an aspect of the present disclosure, it is possible to maintain product miniaturization and minimize an increase in manufacturing cost, as well as increase the accuracy of the lean actuator to improve the performance.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A vehicle body tilting apparatus comprising:
    a swing member connected to a pair of tie rods and provided to be swung around an output shaft;
    a lean actuator configured to swing the swing member by rotating the output shaft through a motor and a reducer so that a vehicle body is tilted in a right-left direction,
    a first angle sensor provided on the motor and configured to detect a relative angle of the motor; and
    a controller electrically connected to the motor,
    wherein the controller is configured to:
        correct a rotation angle of the output shaft based on the relative angle of the motor, and
        control the motor according to the corrected rotation angle, and
    wherein the vehicle body tilting apparatus further comprises:
        an output shaft rotation detector configured to indirectly detect the rotation angle of the output shaft, or
        a second angle sensor including at least one of an absolute angle sensor provided on the output shaft or a relative angle sensor provided on the output shaft.

2. The vehicle body tilting apparatus according to claim 1, wherein the absolute angle sensor is configured to directly detect an absolute angle of the output shaft, and the relative angle sensor is configured to directly detect a relative angle of the output shaft.

3. The vehicle body tilting apparatus according to claim 2, wherein the controller is configured to:
- estimate the relative angle of the motor according to the absolute angle of the output shaft detected by the second angle sensor including the absolute angle sensor,
- detect the relative angle of the motor through the first angle sensor,
- determine a difference between the estimated relative angle of the motor and the detected relative angle of the motor, and
- identify whether or not to correct the rotation angle of the output shaft based on the difference.

4. The vehicle body tilting apparatus according to claim 3, wherein the controller is configured to correct the rotation angle of the output shaft based on a difference between the estimated relative angle and the detected relative angle being smaller than a preset angle.

5. The vehicle body tilting apparatus according to claim 4, wherein the controller is configured to correct the rotation angle of the output shaft based on the difference and a reduction ratio of the reducer.

6. The vehicle body tilting apparatus according to claim 5, wherein the controller is configured to correct the rotation angle of the output shaft to an angle value obtained by adding, to the absolute angle of the output shaft detected by the second angle sensor including the absolute angle sensor, a value obtained by multiplying the difference by the reduction ratio of the reducer.

7. The vehicle body tilting apparatus according to claim 1, wherein the output shaft rotation detector includes:
- a first gear coupled to the output shaft and having a central shaft positioned coaxially with the output shaft,
- a second gear engaged with the first gear to rotate in an opposite direction to the first gear around an auxiliary shaft, and
- an absolute angle sensor provided on the auxiliary shaft and configured to detect an absolute angle of the auxiliary shaft.

8. The vehicle body tilting apparatus according to claim 7, wherein the controller is configured to:
- estimate the relative angle of the motor according to the absolute angle of the auxiliary shaft detected by the absolute angle sensor provided on the auxiliary shaft,
- detect the relative angle of the motor through the first angle sensor,
- determine a difference between the estimated relative angle of the motor and the detected relative angle of the motor, and
- identify whether or not to correct the rotation angle of the output shaft based on the difference.

9. The vehicle body tilting apparatus according to claim 8, wherein the controller is configured to correct the rotation angle of the output shaft if a difference between the estimated relative angle and the detected relative angle is smaller than a preset angle.

10. The vehicle body tilting apparatus according to claim 9, wherein the controller is configured to correct the rotation angle of the output shaft based on the difference and a reduction ratio of the reducer.

11. The vehicle body tilting apparatus according to claim 9, wherein the controller is configured to:
- estimate the rotation angle of the output shaft based on the absolute angle of the auxiliary shaft detected by the absolute angle sensor provided on the auxiliary shaft and a gear ratio between the first gear and the second gear, and
- correct the rotation angle of the output shaft to an angle value obtained by adding, to the estimated rotation angle, an angle value obtained by multiplying the difference by a reduction ratio of the reducer.

12. The vehicle body tilting apparatus according to claim 8, wherein the controller is configured to estimate the relative angle of the motor based on the absolute angle of the auxiliary shaft detected by the absolute angle sensor provided on the auxiliary shaft, a reduction ratio of the reducer, and a gear ratio between the first gear and the second gear.

13. A control method of a vehicle body tilting apparatus including a swing member connected to a pair of tie rods and provided to be swung around an output shaft, a lean actuator configured to swing the swing member by rotating the output shaft through a motor and a reducer so that a vehicle body is tilted in a right-left direction, and a controller electrically connected to the motor, the vehicle body tilting apparatus further including an output shaft rotation detector including a first gear coupled to the output shaft and having a central shaft positioned coaxially with the output shaft, a second gear engaged with the first gear to rotate in an opposite direction to the first gear around an auxiliary shaft, and a rotation angle sensor provided on the auxiliary shaft and configured to detect a rotation angle of the auxiliary shaft, the control method comprising:
- detecting the rotation angle of the auxiliary shaft through the rotation angle sensor;
- estimating a rotation angle of the output shaft according to the detected rotation angle of the auxiliary shaft;
- estimating a relative angle of the motor according to the detected rotation angle of the auxiliary shaft;
- detecting the relative angle of the motor through a relative angle sensor provided on the motor;
- determining a difference between the estimated relative angle of the motor and the detected relative angle of the motor; and
- correcting the estimated rotation angle of the output shaft based on the difference.

14. The control method according to claim 13, wherein the estimating of the rotation angle of the output shaft includes estimating the rotation angle of the output shaft based on the detected rotation angle of the auxiliary shaft and a gear ratio between the first gear and the second gear.

15. The control method according to claim 13, wherein the estimating of the relative angle of the motor includes estimating the relative angle of the motor based on the detected rotation angle of the auxiliary shaft, a reduction ratio of the reducer, and a gear ratio between the first gear and the second gear.

16. The control method according to claim 13, wherein the correcting of the estimated rotation angle of the output shaft includes:
- comparing the difference with a preset angle; and
- correcting the estimated rotation angle of the output shaft based on a difference between the estimated relative angle and the detected relative angle being smaller than the preset angle as a result of the comparing.

17. The control method according to claim 14, wherein the correcting of the estimated rotation angle of the output shaft includes correcting the estimated rotation angle of the output shaft based on the difference and a reduction ratio of the reducer.

18. The control method according to claim 17, wherein the correcting of the estimated rotation angle of the output shaft includes correcting the estimated rotation angle of the output shaft to an angle value obtained by adding the estimated rotation angle of the output shaft to a value obtained by multiplying the difference by the reduction ratio of the reducer.

19. A computer-readable storage medium having a program for executing the method according to claim 13 recorded thereon.

\* \* \* \* \*